F. P. HINCKLEY.
BALING PRESS.
APPLICATION FILED FEB. 24, 1910.

989,260.

Patented Apr. 11, 1911.

Witnesses
H. O. Van Antwerp
Minnie Johnson.

Inventor
FREDERICK P. HINCKLEY
By Luther V. Moulton
Attorney

F. P. HINCKLEY.
BALING PRESS.
APPLICATION FILED FEB. 24, 1910.

989,260. Patented Apr. 11, 1911.

Witnesses
H. O. Van Antwerp
Minnie Johnson.

Inventor
FREDERICK P. HINCKLEY
BY Luther V. Moulton
Attorney

F. P. HINCKLEY.
BALING PRESS.
APPLICATION FILED FEB. 24, 1910.

989,260.

Patented Apr. 11, 1911.

Witnesses
H. O. Van Antwerp
Minnie Johnson

Inventor
FREDERICK P. HINCKLEY.
BY Luther V. Moulton
Attorney

F. P. HINCKLEY.
BALING PRESS.
APPLICATION FILED FEB. 24, 1910.

989,260.

Patented Apr. 11, 1911.

Witnesses
H. O. Van Antwerp
Minnie Johnson.

Inventor
FREDERICK P. HINCKLEY
BY Luther V. Moulton
Attorney

UNITED STATES PATENT OFFICE.

FREDERICK P. HINCKLEY, OF JACKSON, MICHIGAN.

BALING-PRESS.

989,260.

Specification of Letters Patent.   Patented Apr. 11, 1911.

Application filed February 24, 1910.   Serial No. 545,635.

*To all whom it may concern:*

Be it known that I, FREDERICK P. HINCKLEY, a citizen of the United States of America, residing at Jackson, in the county of Jackson and State of Michigan, have invented certain new and useful Improvements in Baling-Presses; and I do hereby declare the following to be a full, clear, and exact description of the invention, such as will enable others skilled in the art to which it appertains to make and use the same.

My invention relates to improvements in baling presses and its object is to provide automatic means for applying wire bands to the bales, and to provide the device with various new and useful features hereinafter more fully described and particularly pointed out in the claims.

My invention consists essentially of a baling press having openings through the case and ram, a rock shaft, arms on the shaft adapted to pass through said openings, a reciprocating rack, means for automatically connecting and disconnecting the rack with the ram at intervals, twisting mechanisms for the wires, together with means for operating said mechanism and arms by movement of the rack, and in various novel features of combination and arrangement, as will more fully appear by reference to the accompanying drawings, in which:

Figs. 18, 21, and 24 are inverted plan views of the twisting mechanism with the parts at corresponding stages of operation; Figs. 19, 22, and 25 end elevations of the right hand end of the twisting mechanism with parts in the various stages of operation corresponding to Figs. 18, 21, and 24. Fig. 29 a transverse section of one of the arms 4; Fig. 31 a perspective of a portion of the parts shown in Figs. 27 and 28; and, Fig. 32 an enlarged perspective detail of one of the arms.

Like numbers refer to like parts in all of the figures.

1 represents a portion of the case of a baling press as usually constructed. The chamber in which the ram travels is provided with a series of slots or openings 2 to permit the arms 4 mounted on a rock shaft 3 to swing through the said chamber, which arms carry wires 6 fed from reels 5 mounted on the case. These arms have grooves 65 for the wires and pulleys 66 at the angles to engage the wires and are also forked or bifurcated at the movable end to guide the wires. The rock shaft 3 is operated by a segment gear 7 engaging a rack 8 slidable in a case 9. This rack is reciprocated by a hook 10 attached to the ram, which hook engages a vertically movable bolt 11 in the rack to carry the same in one direction, and a fixed lug 14 on the end of the rack to carry the same in the opposite direction. The bolt 11 is normally in lowered position, and the rack remains in retracted position. A toothed wheel 20 is journaled beneath the case and extends upward into the case and within the path of the bale, the circumference of this wheel corresponding to the length of the respective bales to be made.

18 and 19 represent relatively rigid arms having slight rotary movement independent of the wheel, freely rotative on their axis and carried around with the wheel by a pin 34ª in the wheel, engaging the arm 18, and limited in movement relative to the wheel by a pin 34 in the wheel engaging the arm 19.

16 is a lever having a projection 17 in the path of the arm 18.

15 is a rod extending from the lever 16 to a trip lever 13 pivoted to the lower part of the rack case and engaging a spring 12, which spring in turn engages and raises the bolt 11. This spring 12 is turned upward at its rear end and divided as at 44, being provided with hooks to engage a triangular projection 43 on the rear end of the rack.

33 represents the twisting and cutting mechanism for the wires, the twisting mechanism of which is operated by a shaft 35 rotated periodically by movement of the rack.

21 is a gear engaging teeth in the rack.

25 is an idler gear engaging the gear 21 and another gear 26 loosely journaled on the shaft 35.

39 is a disk fast on the shaft 35 to rotate the same.

Figure 1:
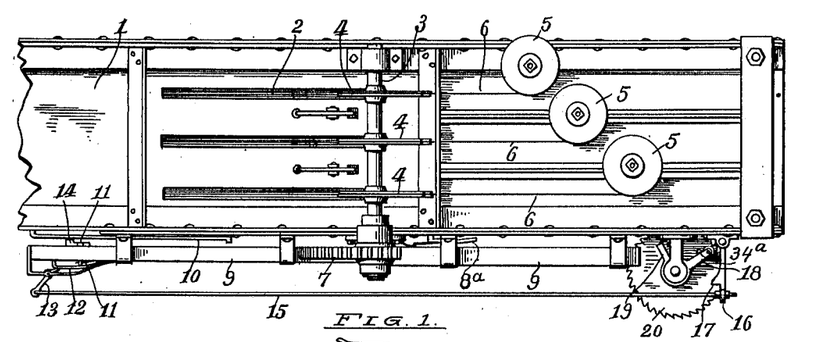
Figure 1 is a side elevation of a portion of a baling press with my improved device attached thereto.
Figure 2:
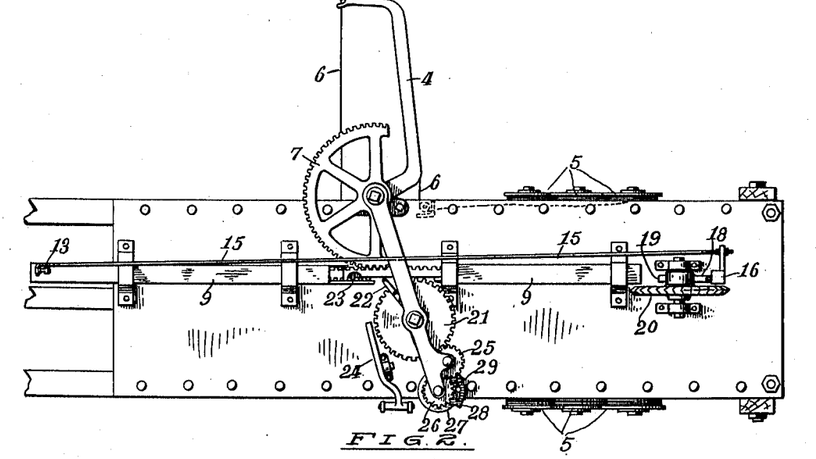
Fig. 2 is an inverted plan view of the same.
Figure 3:
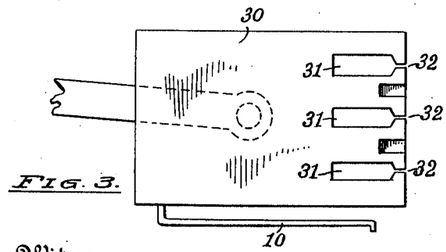
Fig. 3 a side elevation of the modified ram.
Figure 4:
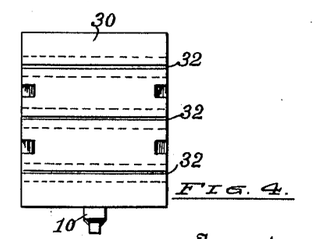
Fig. 4 an end view of the same.
Figure 5:
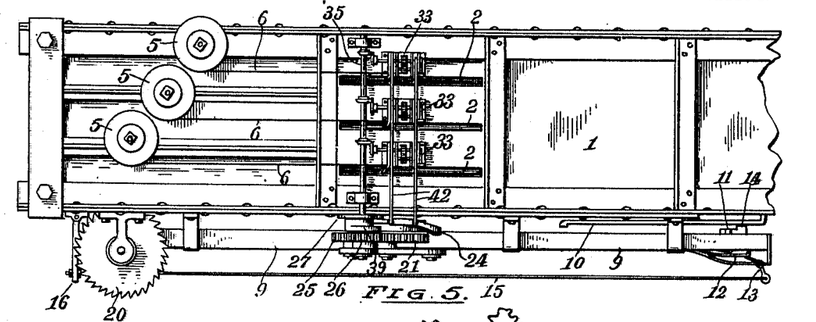
Fig. 5 a side elevation of the device opposite to Fig. 1.
Figures 6, 7, 8, 9, 10, 11, 12, 13, 14, 15, 16:
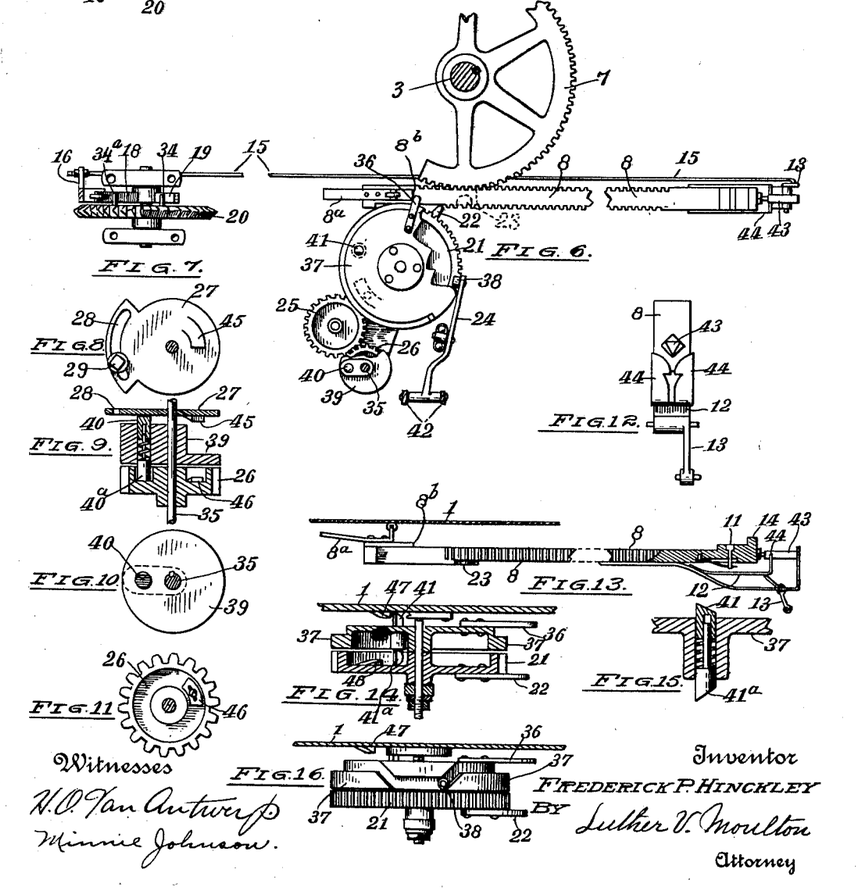
Fig. 6 a detail in plan view of the rack and gearing operated thereby.
Fig. 7 a plan view of the tripping wheel and parts coacting therewith.
Fig. 8 a detail of an adjustable disk 27.
Fig. 9 a detail in vertical section of a part of the mechanism for operating the twister gears.
Fig. 10 a detail of the disk 39 which drives the shaft that operates the twister gears.
Fig. 11 a detail of the gear 26.
Fig. 12 an enlarged end view of the rack, and a part of the coupling mechanism for connecting the rack to the ram.
Fig. 13 a side elevation of the rack and parts attached thereto with a portion of the rack case.
Fig. 14 a vertical section through the cam 37 and gear 21.
Fig. 15 an enlarged detail of the double dog in the cam 37.
Fig. 16 a detail in side elevation of the cam 37 and gear 21.
Figure 17:
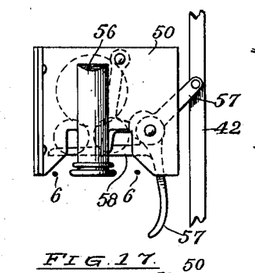
Figs. 17, 20, and 23 show a left hand end elevation of the twisting device with parts in different stages of its operation.

To prevent the twister gears from turning backward, a spring dog 40 is provided to engage a lug 45 on a disk 27 attached to the case, and adjustable by means of a slotted segment 28 held by a binding screw 29. An opposite dog 40ª engages a lug 46 on the gear 26 and transmits motion from the gear to the shaft to operate the twisting gears. On the gear 21 is an arm 22 which engages a recess 23 in the rack bar to properly connect the gear 21 with the rack teeth, the rack bar being devoid of teeth on this side on this end to stop the rotation of the twister gears while the wires are being cut. Above the gear 21 is a cam wheel 37 having a cam groove in its periphery traversed by a roller 38 on a lever 24 connected to rods 42, which extend upward to operate the cutters and levers hereafter described. This cam carries oppositely projecting spring dogs 41 and 41ª, as shown in Figs. 14 and 15. The upper dog engages a stop 47 on the case to keep the cam from turning backward, and the lower dog engages a lug 48 on the gear 21 to operate the cam.

36 is an arm on the cam 37 engaged by a shoulder 8ᵇ on the rack to turn the cam and operate the wire cutters after the gear 21 has been disconnected from the rack 8.

Figure 26:
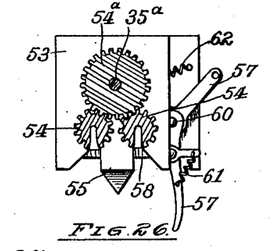
Fig. 26 is a central vertical section of the twisting device with parts in position when out of operation during the formation of a bale.
Figure 27:
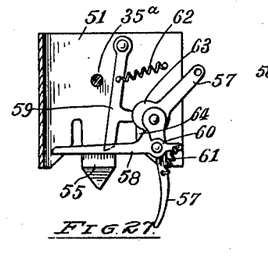
Fig. 27 a corresponding vertical section between the plates 51 and 53 showing the cut-off mechanism at one end.
Figure 28:
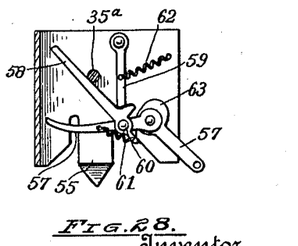
Fig. 28 the same with parts in a different position.
Figures 29, 31, 32:
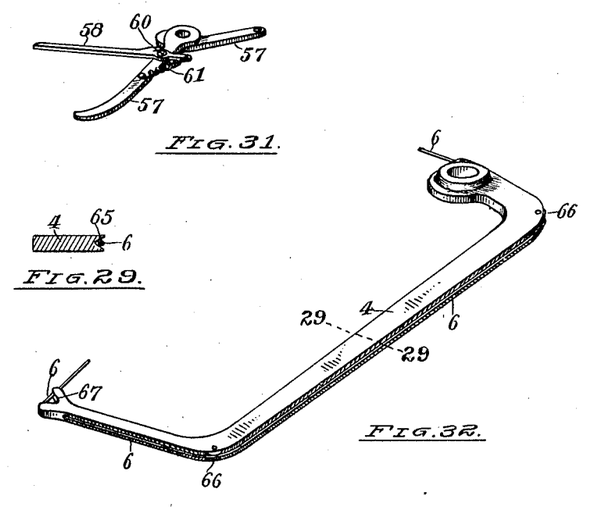

The frame of each twister mechanism consists of two outer plates 50 and 51, two inner plates 52 and 53 parallel therewith, all of the plates being suitably spaced apart from each other. Between these inner plates are journaled two twisting gears 54. These gears, their journals, and their bearings are all slotted to the axis so that the wires can pass into and out of the same. These gears 54 are operated by a gear 54ª (Fig. 26) mounted on a shaft 35ª driven by the shaft 35. On the outer side of the plate 50 is a semi-cylindrical post 56 around which the wire slides and is also movable vertically thereon. On the opposite outer plate 51 is a hook 55 to receive the wire delivered by the forked end of the arm 4 thereto at each operation of the twister. On each plate 50 and 51 is a pivoted lever 57 operated by the rod 42 to raise the wires into the axis of the gears 54. On each of these levers 57 is an arm 58 which moves the wires downward and discharges the same from the gears. On the lever 57 which is below the shaft 35, this arm is pivoted to the lever as at 60 and provided with a shoulder 64, the shoulder being held in contact with the arm by a spring 61, whereby the arm 58 will yield when it comes in contact with the shaft 35ª as illustrated in Fig. 28. To sever the wires, on each plate 5 is pivoted a cutter 59, one of which cutters extends alongside of the post 56 and the other extends alongside of the hook 55, the post and hook being provided with cutting edges coacting with the pivoted blades 59 to shear the wires as the blades are moved. To operate these blades, each adjacent lever 57 is provided with a cam 63 to force the respective blades toward the post and hook, and a spring 62 is provided to retract each blade toward the cam.

During the formation of a bale, the press is operated in the usual way of a baling press, the wires being carried ahead of the bale and feeding from the respective reels along the respective sides of the bale, the wires at one side sliding around the posts 56 as the bale moves forward, and the wires at the other side feeding over the arms and thence along the other side of the bale. The wheel 20 turns about its axis as the preceding bale engages and rotates the same, and when the arm 18 engages the projection 17, the lever 16 is moved and the lever 13 is operated to raise the bolt 11 within the path of the hook 10. The spring 12 will yield sufficient to let the hook pass over the bolt 11 and between it and the lug 14. After the spring 12 has been raised by the lever 13, it will be held up by engagement of the jaws 44 with the triangular member 43, and when the rack bar 8 is moved longitudinally, the jaws 44 will slip off the ends of said member 43 and release the spring 12.

Figure 18:
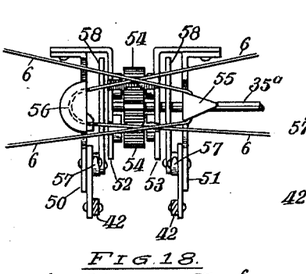
Figure 19:
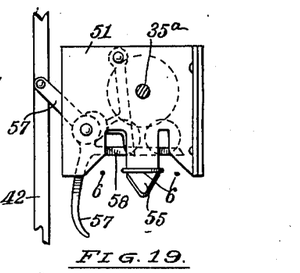
Figure 20:
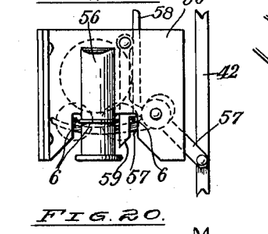
Figure 21:
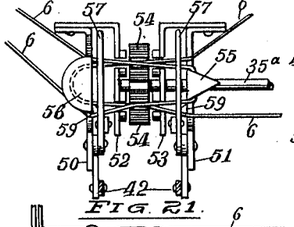
Figure 22:
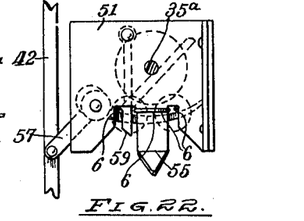
Figure 23:
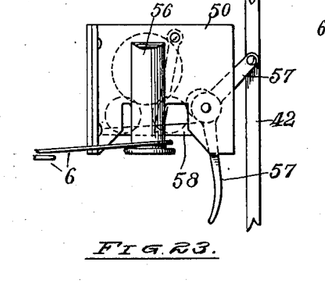
Figure 30:
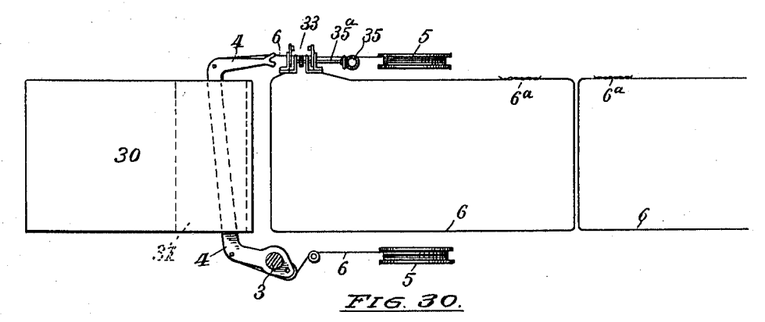
Fig. 30 a diagram showing the wire bands and a portion of the machine.

Should the arm 18 stop opposite the projection 17, the finger 8ª on the rack will engage the arm 19 and throw the arm 18 off said projection. The next stroke of the ram now carries the rack forward and turns the arms 4 through the openings 2 in the case and 31 in the ram. The arm swings forward through the case and ram while the ram is moving forward, and returns while the ram is moving backward, thus going through the ram and back again, without coming in contact with the material and delivering the wire to the joining mechanism at the moment that the bale is fully compressed by the ram. By swinging the arm through these openings in the ram and case, the arms are removed from the baling chamber proper and move through that part of the case traversed by the ram, and the opening in the ram can be ample for the purpose without getting any material into the same, for that only narrow slots are required in the end of the ram next the bale to permit the escape of the wires. The bifurcated end of each arm 67 strikes close below the downwardly inclined hook 55 on each twister and will spring down sufficient to engage the wire with the hook. During the forward stroke of the rack, the gears 21, 25, and 26 run idle, the spring dog 40 running freely over the lug 46 on the gear 26, and the gear 21 making a single revolution carrying the lug 48 under the dog 41 at the end of the forward stroke. Upon the reverse movement of the rack as the ram returns, the engagement of the lug 48 with the dog 41ª now turns the cam 37 and raises the roller 38. This pulls down on the rods 42 and turns the levers 57 from the position shown in Figs. 18, 19, and 20 to the position shown in Figs. 21, 22, and 23. As shown in Fig. 16, the cam wheel delays this movement somewhat to permit the arm 4 to get out of the way of the levers 57. As soon as this movement has taken place and the wires are properly placed in the axis of the gears 54, the dog 40ª is engaged by the lug 46 on the gear 26 and the shaft 35 rotated. This, through the shaft 35ª and gear 54ª, simultaneously rotates the twister gears 54 and twists the wires together in two places at the respective sides of the loops formed therein, as shown in Figs. 18, 21, and 24, and also at 6ª in Fig. 30. Before the cam 37 has made a complete revolution, the gear 21 reaches the blank space on the rack and stops. This discontinues the twisting and the twister gears stop with the slots therein downward and in line with the slots in its axle and bearings. By arranging the gears to stop with the slots downward when not in operation, no material will lodge in the slots to obstruct the operation of the device, or tend to break the same. The shoulder 8ᵇ now engages the arm 36 and restores the cam to starting position, as shown in Fig. 6, which replaces the levers 57 to open position. As the levers 57 turn, the arms 58 push the wires downward out of the twister gears. During this downward movement the cams 63 operate the cutting blades 59 and sever the wires where they are looped around the post 56 and the hook 55. Thus at each operation there are two complete double or reverse twists formed, one of which completes the band around the bale and the other connects the ends of the wires leading from the reels. As the next bale is formed, the wires at each side of the machine are fed along the respective sides of the bale, one wire from the respective arm 4 and the other wire sliding around the post 56 of the twister. At each movement of the arm, the bight of the wire is carried through the chamber 31 of the ram to the knotter, and when severed, one part goes with the bale and the other part stays to form the beginning of the band for the succeeding bale, this portion of the wires passing out of the ram through the narrow slits 32 as the ram recedes.

It will be particularly noted that the movement of the arms is so timed that they place the wire around the bale and deliver it to the twister at the time the ram is fully compressing the bale to its smallest volume, thus placing the band tightly around the bale; also that the narrow slits for the escape of the wires from the ram, effectually prevent any material of the bale from getting into the transverse opening of the ram to interfere with the arm or wires. It will also be noted that the wires being looped and twisted as described, affords no opportunity for the bale to expand during the operation, thus securing tight bands and very compact bales, and that by passing the wire through the ram during the forward stroke thereof and knotting and severing the wire during the backward stroke of the ram, ample time is allowable for these operations without delaying the movement of the ram, thus providing a high speed operation of the machine without undue speed of the wire applying devices.

What I claim is:

1. A baling press, comprising a case, a ram reciprocable in the case, the case and ram having longitudinal slots therethrough, an arm pivoted on the case at one end and adapted to swing through the case and ram and back again, means on the arm for carrying a wire through the case and ram, means for extending a wire along the side of the case opposite to the arm, means for securing said wires to each other, and means adapted to swing the arm through the case and ram during the forward movement of the ram, and, back out of the case and ram during the rearward movement of the ram.

2. A baling press, comprising a case having slots in its opposite sides, a ram having a transverse opening opposite said slots, means for extending a wire at each side of the case, means for carrying the bight of one of said wires through said slots and opening, means for joining the wires in two separate places spaced apart, and means for severing the wires between where they are joined.

3. A baling press, comprising a case having slots in its sides, a ram movable in the case and having transverse openings, arms adapted to carry a wire through said openings and slots, reels at the respective sides of the case, two separate twisters adapted to join two wires in two separate places, and means for severing the wires between where they have been joined.

4. A baling press, comprising a case, a ram movable in the case, a reel at each side of the case each carrying a wire, means for passing the bight of one wire through the case, means for forming two opposing and crossed loops in the wires, means for simultaneously twisting two wires together in two separate places, and means for severing the wires between the two twisted portions.

5. A baling press, comprising a case having slots in its opposite sides, a ram having a transverse opening opposite said slots, an arm adapted to pass through said slots and opening and carry the bight of the wire therethrough, means for forming two opposing and crossed loops in two separate wires, two twister gears to engage and twist the wires in two separate places where the said wires are crossed, and means for severing the loops in said wires between said twisted portions.

6. A baling press, comprising a case having slots in its opposite sides, a ram reciprocable in the case to compress the bale and having a transverse opening opposite the slots to receive an arm and a narrow slot in the end communicating with said opening, an arm passing through the ram and case while the ram is moving forward and contacts the bale, means for joining a wire carried by the arm to a second wire in two places, and means for severing the wires between said places, the wire joining and severing means being in duplicate and acting while the ram is moving backward.

7. A baling press, comprising a case in which the material is compressed, a ram reciprocating in the case, said ram and case having transverse openings, the ram also having a narrow slot communicating with the opening therein, a rock shaft, an arm on the rock shaft adapted to swing through said case and ram, two twister gears having radial slots extending to the axis thereof, a post at one side of the gears to receive a loop of wire, a hook at the other side of the gears to receive a loop of wire from the arm, means for rotating the gears, and means for severing the loops in the wires.

8. In a baling press, means for joining two wires, comprising two radially slotted twisting gears, means for rotating the same, a post at one side of said gears to receive and slidably hold a loop of wire, a hook at the other side of the gears to receive and hold a loop in a second wire, means for moving said loops into and out of the gears, and means for severing said loops after the same have been twisted by the respective gears.

9. A baling press, comprising a case having a longitudinal slot in each side, a ram reciprocating in the case and having a transverse opening opposite the slots, a rock shaft mounted on the case, an arm mounted on the rock shaft and adapted to swing through the openings in the case and ram, two twister gears mounted on the case and slotted radially to the axis, a post at one side of the gears to engage a loop in a wire, a hook at the other side of the gears to receive a loop of wire from the arm, means for moving the wires into and out of the gears, and means for severing the loops in the wires.

10. A baling press, comprising a case having longitudinal slots in its sides, a ram reciprocating in the case and having a transverse opening opposite the slots in the case, a reel at each side of the case, two gears having radial slots, a post at one side of the gears to receive a loop of wire from one reel, a hook at the other side of the gears to receive a loop of wire from the arm, a rock shaft supporting the arm, a segment gear on the rock shaft, a rack longitudinally movable, means for automatically reciprocating the rack at intervals, pivoted levers to move the wires into and out of the slots in the gears, means for periodically rotating the gears, means for periodically operating the levers, blades adapted to sever the loops in the wires, and means for periodically operating the blades.

11. A baling press, comprising a case, a ram reciprocable in the case, means for applying a wire band to a bale, a reciprocable rack beneath the case and adapted to operate said means, a hook on the ram and traversing close to the rack, a lug on the end of the rack to engage the hook, a bolt in the rack near the lug and normally out of the path of the hook, and means for periodically moving the bolt within the path of the hook.

12. A baling press, comprising a case, a ram reciprocable in the case, means for applying a wire band to a bale, a reciprocable rack adapted to operate said means, a wheel having teeth adapted to be engaged by a bale to rotate the wheel, a hook on the ram traversing close to the rack, a bolt in the rack normally out of the path of the hook, and means for moving the bolt into the path of the hook at each revolution of the wheel.

13. A baling press, comprising a case, a ram reciprocable in the case, means for applying wire bands to a bale, a reciprocable rack beneath the case and adapted to operate said means, a hook on the ram and traversing close to the rack, a lug on the end of the rack to engage the hook, a bolt in the rack near the lug, a spring to raise the bolt and having an upturned end provided with hooks, a projection on the rack engaged by the hooks, and means for periodically raising the spring.

14. A baling press, comprising a reciprocable ram, means for applying a wire band to a bale, a reciprocable rack adapted to operate said means, a hook on the ram and traversing close to the rack, a lug on the end of the rack to engage the hook, a triangular projection on the end of the rack, a bolt in the rack and movable into and out of the path of the hook, a spring adapted to move the bolt into said path and having its end bifurcated and shouldered to engage the triangular projection, a lever to move the spring, a wheel to engage a bale and rotated thereby, and means for transmitting motion from the wheel to the lever at each revolution of the wheel.

15. A baling press, comprising a case, a reciprocating ram in the case, means for applying a wire band to a bale, a reciprocable rack adapted to operate said means, a wheel having teeth to engage a bale and rotated thereby, an arm freely rotative near the wheel, a pin in the wheel engaging the arm, a lever moved by the arm at each rotation of the wheels, and means operated by the lever for periodically connecting the ram and rack.

16. A baling press, comprising a case, a reciprocating ram in the case, means for applying a wire band to a bale, a reciprocable rack adapted to operate said means, a wheel having teeth to engage a bale and rotated thereby, two rigidly connected arms near the wheel and independently rotative, a pin in the wheel to rotate the arms, a projection on the rack to move the arms, a lever having a projection engaged by one of the arms to move the lever, and means operated by the lever for periodically connecting the ram and rack.

17. A baling press, comprising a case, a ram reciprocating in the case, means for applying a wire band to a bale, a reciprocable rack to operate said means, a hook on the ram traversing close to the rack, a bolt in the rack adapted to move into and out of the path of the hook, a lever to move the bolt, a rod to move the lever, a second lever to move the rod, a wheel having teeth to engage a bale and rotated thereby, and an arm rotated by the wheel and adapted to engage the last named lever at each rotation of the wheel.

18. A baling press, comprising a case, a ram reciprocating in the case, means for applying a wire band to a bale, a reciprocable rack adapted to operate said means, a hook on the ram traversing close to the rack, a lug on the end of the rack to engage the hook and retract the rack, a bolt in the rack adapted to move into and out of the path of the hook, a spring to move the bolt, a lever to move the spring, a rod to move the lever, a second lever to move the rod, an independently rotative arm to move the second lever, a wheel having a pin to rotate the arm and provided with teeth to engage a bale and rotate the wheel, and a projection on the rack to move the arm out of engagement with the second lever.

19. A baling press, comprising means for forming a bale, means for extending wires around the bale, gears having radial slots adapted to receive the wires, means for rotating the gears, and means for stopping the gears with the slots therein downward, whereby obstructions will not lodge therein.

20. A baling press, comprising means for forming a bale, means for extending a wire along one side of a bale, means for extending another wire on the ends and the other side of the bale, gears adapted to twist the wires together in two separate places spaced apart, means for rotating the gears, and means for severing the wires between where they are joined.

21. A baling press, comprising means for forming a bale, means for extending wires around the bale and forming two crossed loops therein, two twister gears having longitudinal slots to receive the wires where the same are crossed, a shaft to rotate said gears, a periodically reciprocated rack, a train of gears operated by said rack, the last one being loosely journaled on said shaft, a disk fixed on the shaft near the gear, a dog on the disk, and a lug on the gear and adapted to rotate the shaft in one direction only.

22. A baling press, comprising a case, a ram reciprocable in the case, a reel at each side of the case, a post to engage a wire extending from one reel, a hook to receive a wire extending from the other reel, means for passing the bight of the last named wire through the case and ram and engaging the loop of the same with the hook, twister gears between the post and hook and having radial slots to receive the crossed wires, levers to move the wires into the slots, arms to move the wires out of the slots, blades to sever the loops of the wires, a reciprocable rack adapted to operate the gears, levers, and arms, and means for periodically reciprocating the rack.

23. A baling press, comprising means for forming a bale, means for passing a wire around the bale and forming two crossed loops therein, a post and a hook to hold said loops, gears having radial slots to receive the wires where the same are crossed, levers to move the wires into the gears, arms to move the wires out of the gears, blades co-acting with the post and hook to sever the loops, and means for periodically operating the gears, the levers, the arms, and the blades.

24. A baling press, comprising a case having a fixed lug, means for forming a bale, means for passing a wire around the bale and forming crossed loops therein, gears having radial slots to receive the wires where they are crossed, a shaft to rotate the gears, a gear loosely journaled on the shaft and having a periodical oscillatory motion and also having a lug, a disk keyed on the shaft to rotate the same, a dog in the disk engaging the lug on the case to hold the shaft from rotating in one direction, and a second dog in the disk engaging the lug on the gear to rotate the shaft in the other direction.

25. A baling press, comprising means for forming a bale, means for passing a wire around the bale and forming crossed loops therein, gears having radial slots to receive the wires where they are crossed, a post and a hook to receive and hold the loops of the wires, a shaft to rotate the gears, a reciprocable rack, means for periodically reciprocating the rack, a train of gears driven by the rack, the last gear of said train being rotative on the shaft, a disk fixed on the shaft, oppositely projecting dogs on the disk, an adjustable disk having a lug to engage one of said dogs and hold the shaft from turning, and a lug on the said last gear to engage the dog and rotate the shaft.

26. A baling press, comprising means for forming a bale, means for passing wires around the bale and forming two crossed loops therein, twister gears having radial slots to receive the wires where they are crossed, a shaft to rotate said gears, a gear loosely journaled on said shaft, a reciprocable rack having a blank space at one end, and also having a recess and a shoulder, a gear engaged by the rack and connected to the twister gears to operate the same, an arm on the gear to engage the recess in the rack, levers to move the wires into and out of the twister gears, blades to sever the loops of the wires, a cam to operate said levers and blades, an arm on the cam to engage the shoulder on the rack, and means for connecting the cam to the gear engaging the rack to operate the cam.

27. A baling press, comprising means for forming a bale, means for passing wires around the bale and forming crossed loops therein, radially slotted gears, levers to move the wires into and out of said gears, blades for severing the wires, cams on the levers to operate the blades, means for rotating the gears, and means for operating the levers.

28. A baling press, comprising means for forming a bale, means for passing wires around said bale and forming crossed loops therein, a post and a hook to engage and hold said loops, two twister gears between the post and hook and having radial slots to receive the wires, levers to move the wires into the gears, arms on the levers to move the wires out of the gears, blades co-acting with the post and hook to sever the wires, and means for periodically oscillating the levers, arms, and blades.

29. A baling press, comprising means for forming a bale, means for extending a wire along one side of the bale, means for extending a second wire along the other side of the bale and across the ends of the bale, a post and a hook to receive crossed loops in said wires and having cutting edges, twister gears having radial slots to receive the wires, means for periodically rotating said gears, levers to move the wires into the gears, arms on the levers to move the wires out of said gears, pivoted blades co-acting with the cutting edges of the post and hook to sever the wires, cams on the levers to operate the blades, and means for periodically oscillating the levers.

30. A baling press, comprising means for forming a bale, means for extending a wire along one side of the bale, means for extending a second wire along the other side of the bale and across the ends thereof, a post and a hook to receive crossed loops in the wires, gears having radial slots to receive the wires, a gear to engage and drive said gears, a shaft to drive said gear, a lever to move the wires into the slots, arms on the levers to move the wires out of said slots, the arm opposite the shaft being pivoted to the lever and provided with a shoulder engaging the lever, a spring to hold the shoulder in contact with the lever, means for periodically rotating the shaft, and means for periodically oscillating the levers.

31. A baling press, comprising means for continuously forming bales, means for extending a wire along one side of the bales, a post engaged by the wire and forming a loop therein, means for extending a second wire along the opposite side of the bales, a pivoted arm carrying said second wire and adapted to carry the bight of the same between the ends of the adjacent bales, a hook to receive the bight of said wire from the arm and hold the same in a loop extending oppositely to the loop in the first named wire, means for twisting the wires together in two places, and means for severing the loops in the wires.

32. A baling press, comprising means for continuously forming bales, means for extending a wire along one side of the bales, a post engaging said wire and forming a loop therein, means for extending a second wire along the opposite side of the bales, a pivoted arm adapted to swing across the rear end of the last bale and beyond the said post, said arm having a forked end carrying the second wire, a hook to receive the wire from said end of the arm and form the same into a loop oppositely extending to the first named loop and crossing the same, two gears having radial slots to receive the wires, two levers to move the wires into said slots, arms on the levers to move the wires out of the gears, two blades severally co-acting with the post and hook to sever the wires, and means for operating the gears, levers, and blades.

33. A baling press, comprising means for forming a bale, means for extending a wire along one side of the bale, a post engaging said wire and forming a loop therein, means for extending a wire along the other side of the bale, a pivoted arm adapted to periodically swing around the end of the bale and beyond the post, said arm having a forked end carrying the bight of the wire, a hook to receive the wire from said forked end and form the same into a loop crossing the other wire in two places, gears having radial slots to receive the wires, levers to move the wires into the slots, arms on the levers to move the wires out of the slots, blades co-acting with the post and hook to sever the wires, cams on the levers to move the blades, rods to operate the levers, a lever to operate the rods, a cam to operate the lever, a rack to operate the cam, and means for periodically rotating the slotted gears.

34. In combination with a baling press, a reel at one side of the press to supply a wire to one side of the bale, a post to engage the wire and form a loop therein, a reel at the other side of the press to supply a wire to the other side of the bale, a pivoted arm to carry the bight of the last named wire transversely through the press and beyond the post, a hook to receive the wire from the arm and form a loop therein crossing the first named loop and projecting oppositely thereto, slotted gears to twist the wires in two places where they cross, levers to move the wires into and out of the gears, blades to sever the loops of the wires, and means for operating the gears, levers, and blades.

In testimony whereof I affix my signature in presence of two witnesses.

FREDERICK P. HINCKLEY.

Witnesses:
GEORGIANA CHACE,
LUTHER V. MOULTON.